UNITED STATES PATENT OFFICE.

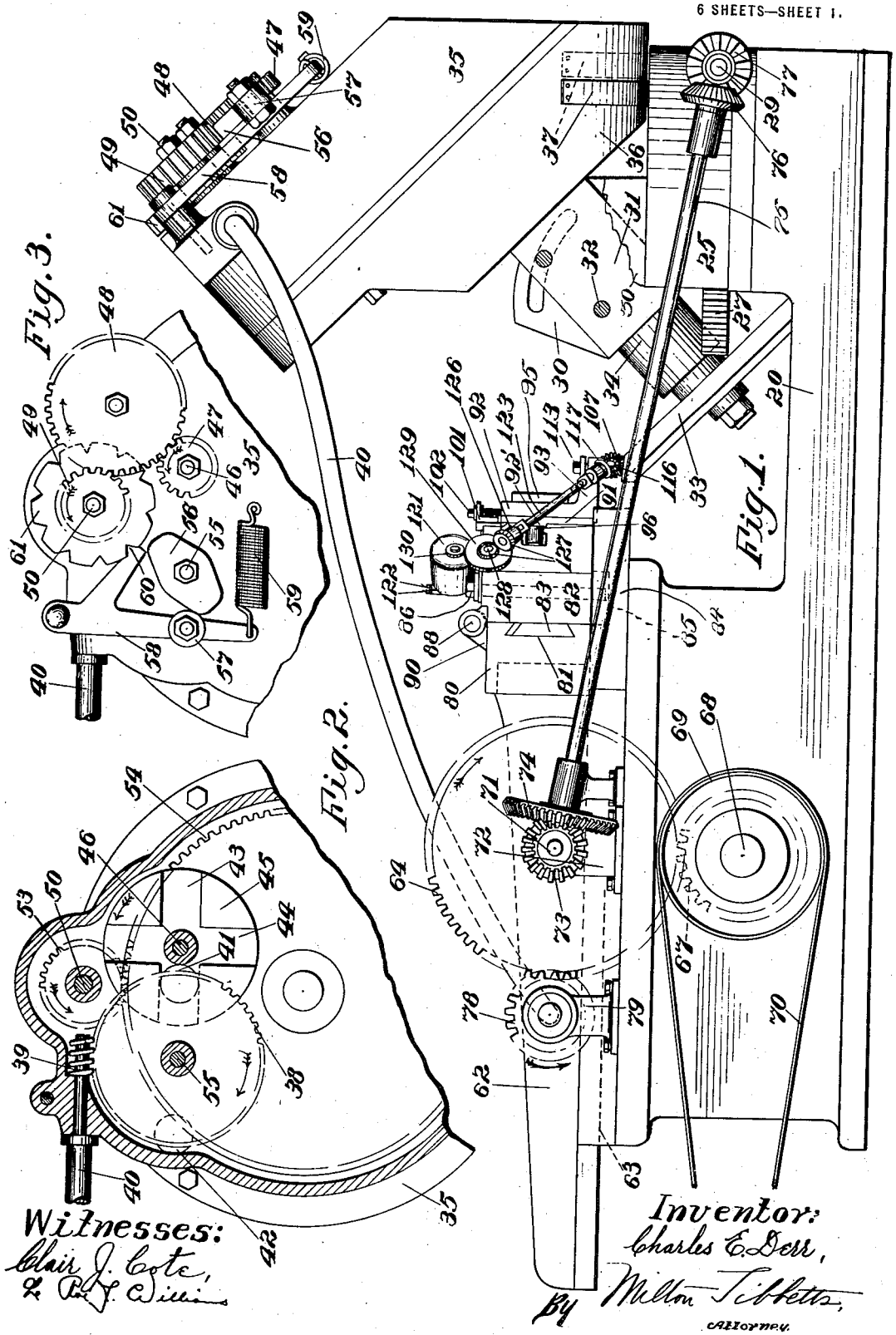

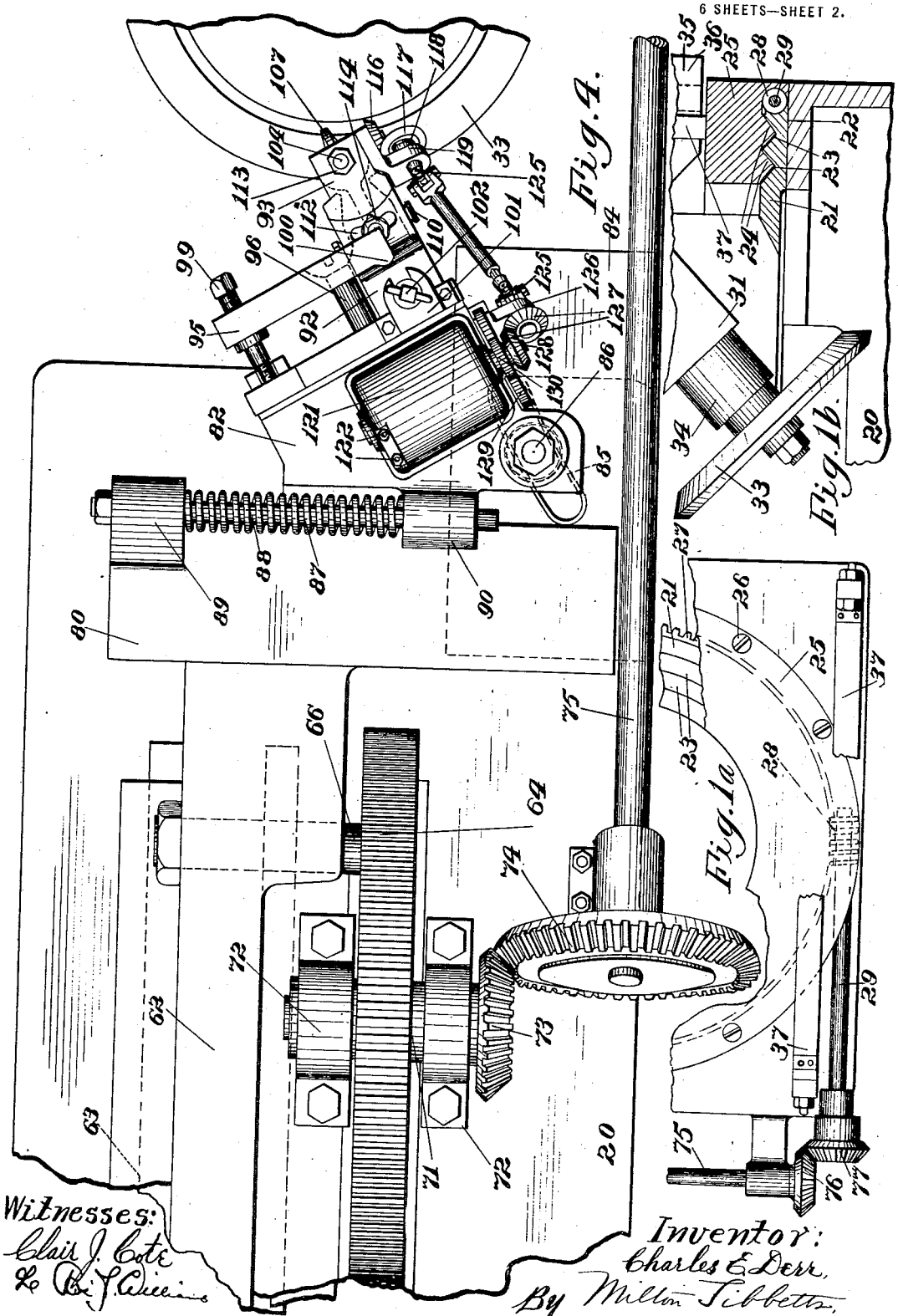

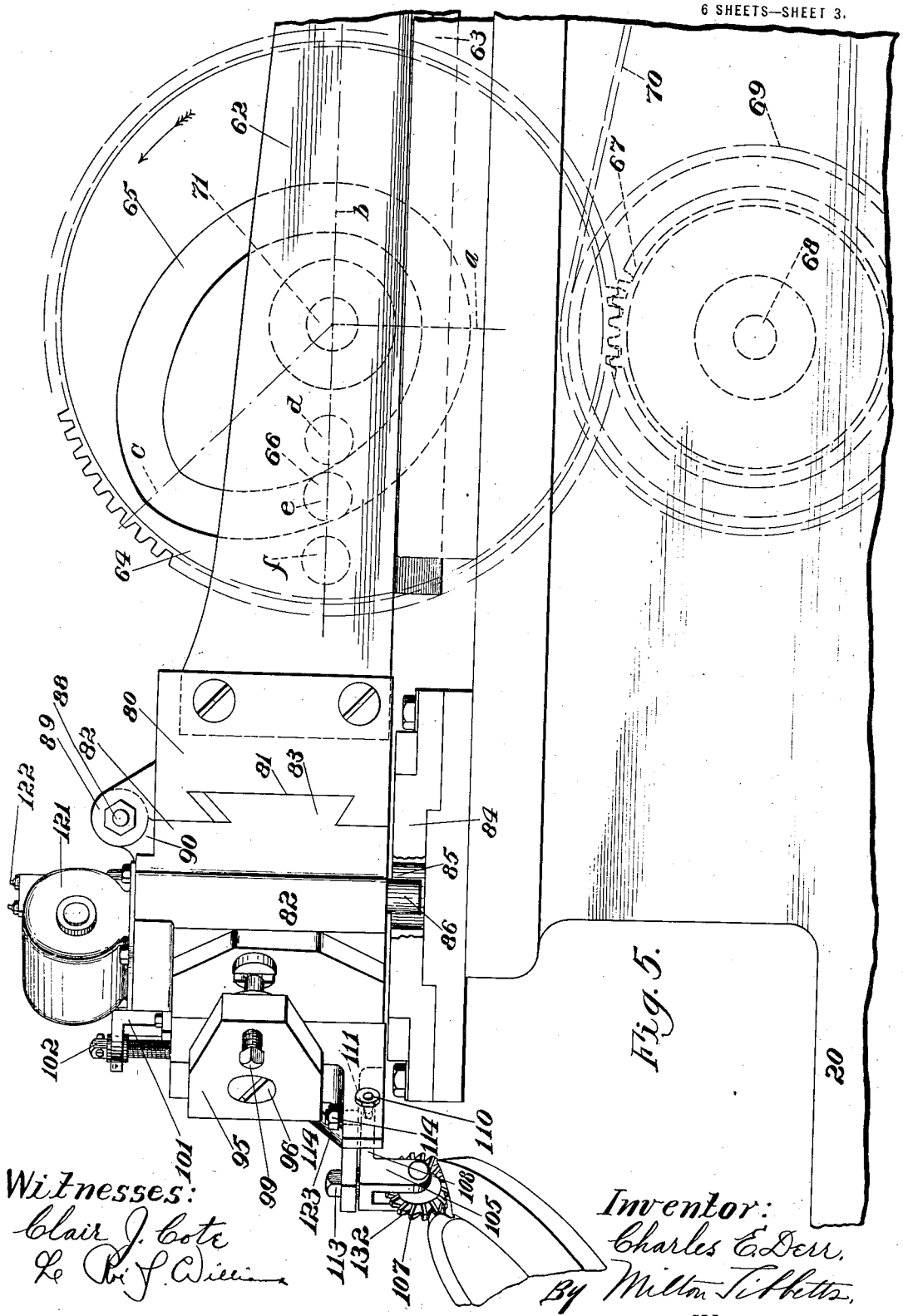

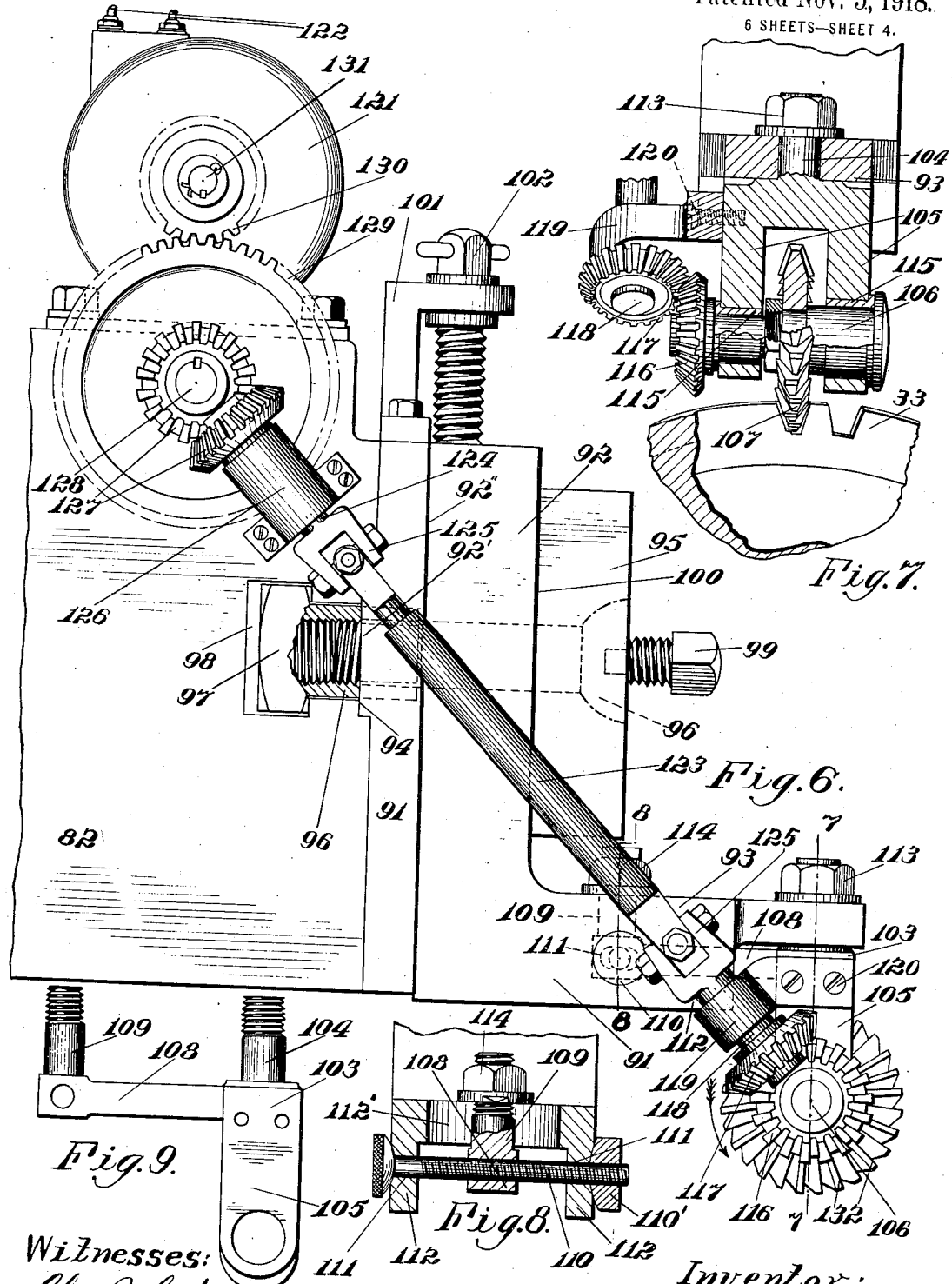

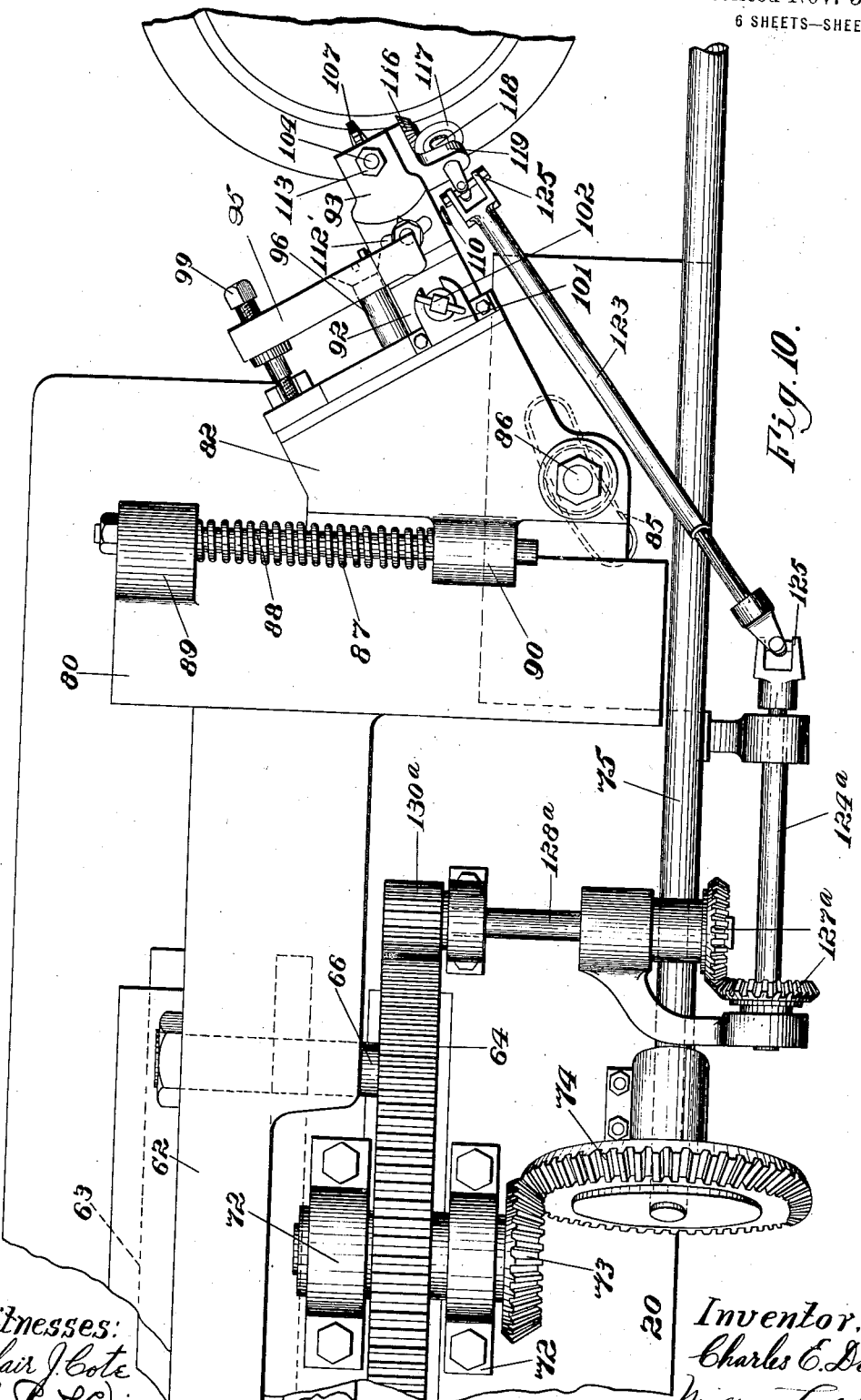

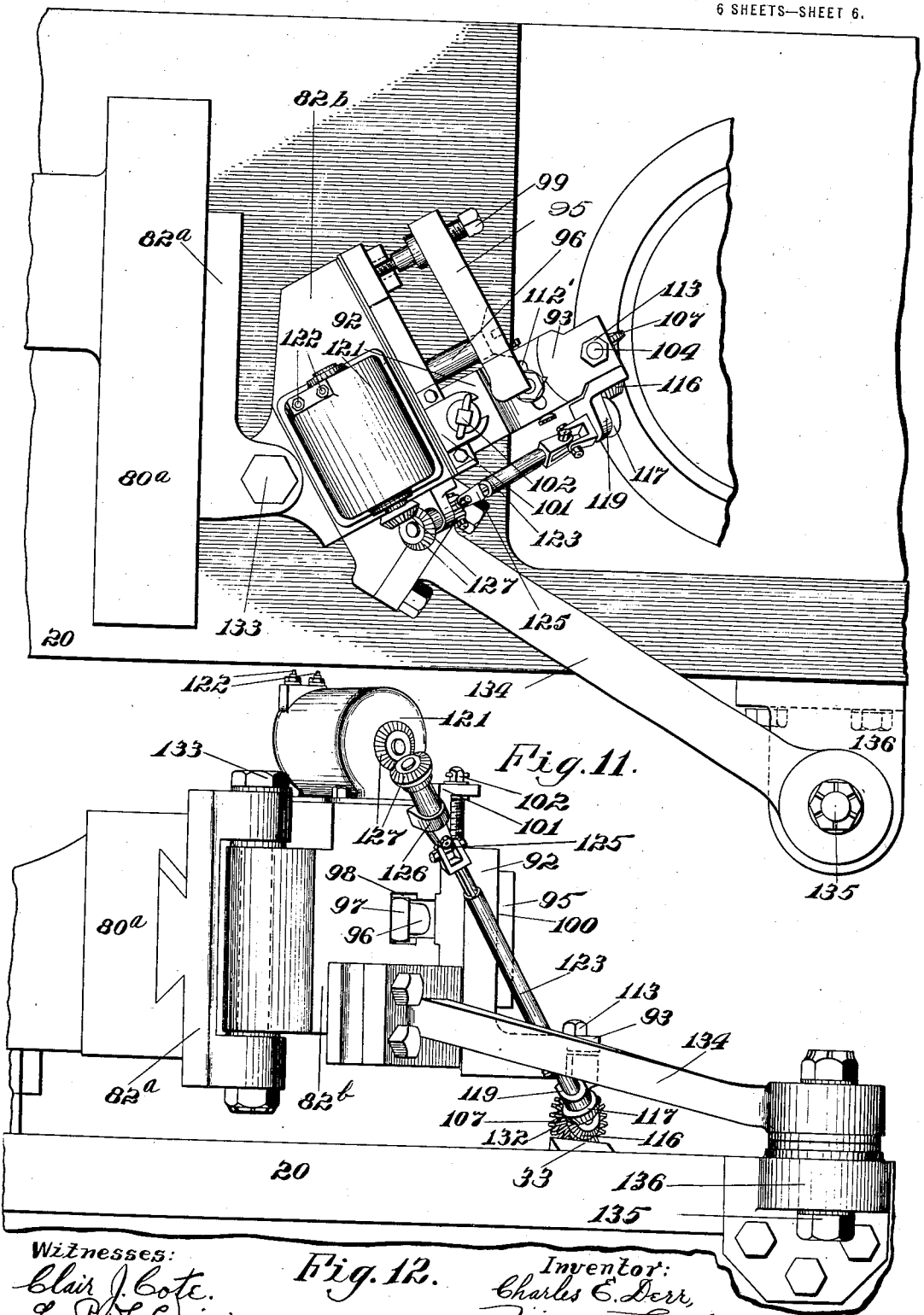

CHARLES E. DERR, OF DETROIT, MICHIGAN, ASSIGNOR TO PACKARD MOTOR CAR COMPANY, OF DETROIT, MICHIGAN, A CORPORATION OF MICHIGAN.

MACHINE FOR CUTTING GEARS.

1,283,693.  Specification of Letters Patent.  Patented Nov. 5, 1918.

Application filed June 14, 1915. Serial No. 34,044.

*To all whom it may concern:*

Be it known that I, CHARLES E. DERR, a citizen of the United States, and resident of Detroit, Wayne county, State of Michigan, have invented certain new and useful Improvements in Machines for Cutting Gears, of which the following is a specification.

This invention relates to machines for cutting gears, and particularly bevel gears, and has for its salient object to provide a machine that will cut tooth faces rapidly, smoothly and accurately.

In the embodiments of the invention herein shown a comparatively small rotary cutter or tool is used, the cutter having radially arranged cutting edges of substantially rack tooth form. The cutter is rotated about its axis and fed into the blank, and the latter is rolled on its pitch surface for the purpose of generating the well known involute tooth form, and is also rotated tooth by tooth in time with the feeding movement of the cutter.

The above and other objects of the invention will appear from the following detail description taken in connection with the drawings which form a part of this specification, and in which:—

Figure 1 is a side elevation of a machine embodying the invention;

Fig. 1ᵃ is a plan view of the extreme right hand end of the machine with the blank supporting and indexing means removed;

Fig. 1ᵇ is a vertical sectional view of the right hand end of the machine;

Figs. 2 and 3 are detail views of the blank indexing mechanism;

Fig. 4 is a slightly enlarged plan view of the greater part of the mechanism shown in Fig. 1;

Fig. 5 is a slightly enlarged side elevation of the cutter carrier operating mechanism, from the side opposite to that of Fig. 1;

Fig. 6 is a more enlarged side elevation of the cutter carrier and the means for rotating the cutter;

Fig. 7 is a vertical section substantially on the line 7—7 of Fig. 6, parts being shown in elevation;

Fig. 8 is a section on the line 8—8 of Fig. 6;

Fig. 9 is a detail side view of the cutter holder;

Fig. 10 is a plan view showing another form of driving mechanism for the cutter;

Fig. 11 is a plan view showing another form of the invention; and

Fig. 12 is a side elevation of the machine shown in Fig. 11.

Referring to the drawings, the frame or bed of the machine is indicated at 20, and upon the right hand end of the frame, as shown in Fig. 1, is mounted the means for supporting and operating the gear blank. Referring to said Fig. 1 and to Figs. 1ᵃ and 1ᵇ, it will be seen that this supporting means consists principally of a plate 21 mounted upon a flat upper surface 22 of the frame, and having a series of circular grooves 23 in which fit the corresponding circular flanges 24 of a securing plate 25, which is fastened to the frame by the screws 26. The circumference of the plate 21 is formed with gear teeth 27, with which meshes a worm 28 driven by a shaft 29, whereby the plate 21 is rotated or oscillated about a vertical axis which passes through the apex of the former-cone, hereinafter described.

The plate 21 carries two uprights 30 between which is adjustably held a block or bearing 31, as by bolts 32. Thus this bearing is adjustable about the apex of the former-cone for operation upon different sized gears or blanks.

The blank 33 is removably clamped to the arbor 34 which operates in the bearing 31, and upon the upper end of the arbor is rotatably mounted the housing 35 of the spacing head, the lower part of this housing comprising the former-cone 36, which is a production of the pitch cone of the blank 33. By means of two steel bands 37, each of which has one end attached to the cone 36 and the other to the body of the machine in such a way that one band prevents the slipping of the cone in one direction and the other in the other direction, the said cone is so held that when the grooved plate 21 is oscillated, the cone will assume a motion as of a cone rolling on a plane without slip. If the housing 35, of which the said cone is a part, were coupled to the blank arbor 34, this rolling motion would be transmitted to the blank 33, thereby imparting to the latter that motion which is necessary to cause the tool to generate the proper tooth contour.

As a matter of fact, however, the housing 35 is only intermittently coupled to the arbor 34—namely, during the cutting stroke or strokes of the cutter. During a period in which the cutter or tool is not cutting, the blank arbor is rotated in relation to the housing 35 through the distance, preferably, of one tooth of the blank 33. This intermittent rotation is accomplished as follows:—Within the housing 35 is rotatably mounted a worm wheel 38, shown in Fig. 2, which worm wheel is driven by means of a worm 39, operated by a flexible shaft 40 (see Figs. 1, 2 and 3), from the cutter operating mechanism and in timed relation therewith, so that the worm wheel 38 will make one-half of a revolution for every full forward and back movement of the cutter.

The face of the worm wheel 38 is provided with two rollers 41 and 42, which engage with two gooves 43 and 44, planed at right angles to each other into the face of a wheel 45. As the worm wheel 38 is rotated one of the rollers will enter a groove in the wheel 45 and impart to it a rotary movement of an accelerating nature. When the worm wheel reaches the position shown in Fig. 2 it has completed one-eighth of a rotation after the roller 41 has entered the groove 43, and has imparted to wheel 45 one-eighth of a revolution, the rate of motion or speed of the wheel 45 being now at its maximum. As the worm wheel 38 completes another one-eighth of a revolution, the movement imparted to the wheel 45 will be of a retarding nature. At this time the groove 43 of the wheel 45 will arrive at the position which the groove 44 assumed when the roller 41 entered the groove 43, and the roller 41 will leave the groove. During the next quarter turn of the worm wheel 38, the wheel 45 will remain stationary until the first semi-revolution of the worm wheel has been completed and the rollers 41 and 42 have exchanged their positions. The roller 42 will then enter the groove 44, and the process described above will be repeated. In this way, an intermittent motion is imparted to the wheel 45, which is so timed that a quarter rotation occurs during a period of rest or inaction of the cutting tool, while the wheel 45 will remain at rest during the cutting period of said tool. The wheel 45 is secured to an arbor 46, to which is clamped a change-wheel 47, Fig. 3. This wheel is geared through an idler 48 to the change-wheel 49, which is clamped to an arbor 50, upon which is also secured a spacing pinion 53. This pinion 53 engages with the master wheel 54, which is secured to the blank arbor 34. Thus the train of gears just described connects the groove wheel 45 with the blank arbor 34. The change-gears are preferably so selected that for each quarter revolution of the wheel 45, the blank 33 is rotated through the space of one tooth.

For holding the blank firmly during the cutting period of the cutter, an anchor is provided as follows:—To the arbor 55 of the worm wheel 38, is secured a cam 56, Fig. 3, which engages with the cam roller 57 of the anchor lever 58, the spring 59 holding the roller in contact with the cam. The lever 58 carries the anchor toe 60, engaging with the notched anchor-wheel 61, which is clamped to the pinion arbor 50. The cam 56 is so timed that the wheel 61 will be anchored during the cutting period of the cutter and released during the idle or non-cutting period, these periods being more fully hereinafter described.

Upon the left hand end of the frame 20, as shown in Fig. 1 of the drawings, the mechanism for operating the cutter or tool is mounted. A ram 62 is arranged to slide in ways 63 on the frame of the machine, and is reciprocated by means of a wheel 64 having a cam slot 65 operating upon a pin 66 on the ram. The wheel has peripheral gear teeth and is turned by a pinion 67 which is rotated by any suitable source of power through shaft 68, pulley 69 and belt 70. The shaft 71 of the wheel 64 is mounted on the frame in suitable bearings 72 and a bevel gear 73 on said shaft meshes with a gear 74 and drives a shaft 75, which in turn, through bevel gears 76 and 77 drives the shaft 29 for operating the mechanism for rolling the blank on its pitch surface during the cutting operation, as hereinabove described. Also the gear wheel 64 meshes with the pinion 78 mounted in a bracket 79 and connected to operate the flexible shaft 40 hereinabove referred to.

The ram 62 is formed with a head 80 in the front face of which there is a dovetail groove 81. A carrier 82 for the cutter or tool is supported on the head 80 and has a dovetail 83 fitting the groove 81 whereby it may slide laterally as the ram is reciprocated. Suitably supported on the bed of the machine, and shown as beneath the carrier 82, is a cam plate 84 having a cam slot 85 which guides a pin or roller 86 projecting downwardly from the carrier. Thus the carrier is guided laterally as the ram moves forwardly and back, and as the slot is shown as circular or arc shape in form the carrier will be given a movement of translation in a circular arc as it is moved by the ram. A coil spring 87 on a rod 88 is arranged between a lug 89 on the head 80 and an alined lug 90 on the carrier 82, for the purpose of yieldingly holding the roller 86 against one side of the cam slot 85 and thereby taking up any backlash that may be present and promote a smoother movement of the carrier.

An adjustable bracket 91 is mounted on the carrier 82 and affords a support for the cutter holder hereinafter described. This bracket 91 is substantially L-shaped, having an upright body portion 92 and a forwardly extending portion 93. It is formed with a horizontal rib 92' which slides in a groove 94 in the front face of the carrier, and it is clamped to the carrier in adjusted position by means of a clamping plate 95 which has a two-part bolt 96, the square head 97 of a which enters the T-slot 98 in the carrier, and a tightening bolt 99 which clamps the part 100 of the plate 95 against the bracket. Thus the bolt 99 may be unscrewed sufficiently to free the bracket and the latter adjusted laterally the desired amount, and then the bolt may be tightened to secure the bracket in adjusted position. If desired the upright part 92 of the bracket may be made in two parts for effecting a vertical adjustment of the cutter. Thus the part 92 may be divided along the line 92'', a cleat 101 mounted on one of the parts, and a hand screw 102 used to vertically adjust the one part relative to the other, the clamp 95 being loosened to permit the adjustment and afterward tightened.

A cutter holder 103, shown in detail in Fig. 9, has a substantially vertical spindle 104 which is mounted in the front end of the forward extension 93 of the bracket 91. It also has two spaced, downwardly extending arms 105 which form bearings for the spindle 106 of the rotary cutter 107, and a rearwardly extending tail piece 108 having an upright bolt end 109. The holder therefore, is pivotally supported in the bracket 91 in line with the axis about which the cutter rotates, and it may be adjusted about the axis of its spindle 104 by moving the tail piece, this being accomplished by a screw-bolt 110 passing laterally through the tail piece and through slots 111 in flanges 112 of the forward extension 93. It will be seen that the bolt end 109 operates in a slot 112' in said extension so that the tail piece may be shifted laterally by said screw-bolt 110 to secure the desired angle of cutting edge to the path of travel of the cutter, and when properly adjusted the holder 103 may be clamped in position by nuts 113 and 114 on the protruding ends of the spindle 104 and bolt end 109, respectively. A nut 110' on the end of the screw-bolt 110 holds the latter after adjustment.

The spindle 106 of the cutter, is mounted in suitable bushings 115 in the arms 105, and is provided with a bevel gear 116 which meshes with a similar gear 117 on a shaft 118, mounted in a cleat or bracket 119 secured to the side of the holder 103 as by screws 120. The shaft 118, and consequently the cutter 107, are adapted to be driven by any suitable power means, but preferably a comparatively small electric motor 121 is used for the purpose and mounted on top of the carrier 82. Flexible conductors 122 are provided for conveying current to the motor. To permit the ready adjustment of the holder 103 on the carrier, the motor 121 is connected to the shaft 118 through a flexible shaft 123, the middle part thereof being extensible and connected to shaft 118 and a short shaft 124, respectively, through universal joints 125. Preferably also a reduction gearing is employed, the short shaft 124, which is mounted in a suitable bearing 126 being connected through bevel gears 127 to a lay shaft 128, upon which is a large gear wheel 129 which meshes with a pinion 130 directly on the armature shaft 131 of the motor.

Another form of driving mechanism for the cutter is shown in Fig. 10, in which the universally jointed shaft 123 is connected to a shaft 124ª mounted in brackets on the frame of the machine and driven by bevel gears 127ª and a shaft 128ª, upon which is a pinion 130ª meshing with the gear wheel 64 which operates the ram. Thus one of the main rotating elements of the machine is used to drive the cutter also, the constantly shifting position of the cutter relative to the base or frame of the machine being taken up by the flexible shaft 123.

The circular or rotary cutter 107 has radially arranged cutting edges 132 of substantially rack tooth form, the cutter shown having its edges staggered so that each of the edges on one side of the cutter is spaced circumferentially between two edges on the other side thereof. Thus the edges on opposite sides of the cutter operate alternately. It will be evident that if the cutter were fed through a gear blank while the latter remained stationary a V-shaped groove or tooth space would be cut in the blank, but when the blank is rolled on its surface under the cutter during its operation, as by the mechanism hereinabove described, the cut out tooth space leaves tooth faces of involute form. The rapid rotation of the cutter permits small chips to be taken and consequently a very smooth and accurate tooth face is produced.

It will be seen also that this form of cutter lends itself well to the formation of curved or indirect teeth, the term indirect being used in the sense of devious or not straight to bring out the fact that this machine is used to cut teeth which cannot be correctly described as either straight or curved, as for example herringbone teeth. In Fig. 4 of the drawings the cam slot 85 is of arc shape and arranged diagonally with reference to the path of travel of the ram, causing the cutter therefore, to describe a curved path in a generally diagonal direction across the face of the blank.

In Figs. 11 and 12 the rotary form of cutter is combined with a carrier which moves bodily about a given axis or pivot, the tool swinging in an arc concentrically about an axis instead of moving in a translatory path as in the other machines shown. The carrier is here shown as formed in two parts $82^a$ and $82^b$, pivoted together by the bolt 133. The part $82^a$ slides in the head $80^a$ of the ram and the part $82^b$ is integrally formed with or rigidly connected to an arm 134 which is pivoted through a vertical pivot 135 to a bracket 136 on the frame or bed of the machine. Thus as the ram 62 is moved forwardly, as in the other forms of the invention, the carrier slides laterally in the head, but its forward part $82^b$ is guided by the pivot 135 and swings concentrically around it. Thus the horizontal axis of the cutter is always maintained exactly radially of the point forming the axis of the curve on which the gear teeth are being cut.

The operation of the machine may be described as follows: When the pulley 69 is put in operation a reciprocating motion is imparted to the ram 62 by means of the cam slot 65 and pin 66, the shape of the slot, as shown particularly in Fig. 5, being such that the ram is practically at rest during a part of the revolution of the wheel 64, then advances at a substantially uniform speed until it reaches the limit of its outstroke, then retreats in the same manner to the limit of its instroke where it rests and the operation is repeated. The part of the slot between the broken lines $a$ and $b$ is substantially concentric with the axis of the wheel, so that while the pin 66 is operating therein, the ram will remain at rest at the inner limit of its travel, this position of the pin being shown in dotted lines at $d$. The slot from the line $a$ to the line $c$ progresses toward the periphery of the wheel and consequently advances the ram, and from $c$ to $b$ the reverse action takes place. The pin is shown at substantially mid-position at $e$ and at its outer position at $f$, in Fig. 5. It will be understood that the indexing mechanism shown in Figs. 1, 2 and 3 holds the blank 33 firmly during the forward and return movement of the ram while the cutter is operating on the blank, and that it rotates the blank about its axis preferably one tooth space while the ram is in a state of rest or while the pin 66 is operating in the concentric portion of the slot 65. Also, with the forward movement of the ram, the carrier 82 moves forwardly, guided however, by the cam slot 85 which gives it a lateral movement resulting in a movement of translation in a curved path, as described above. The entire carrier mechanism, including the cutter, partakes of this translatory path of movement, and the cutter therefore, as it rapidly revolves, is fed into the blank and cuts a tooth space therein. Simultaneously with the feeding of the cutter is the rolling of the blank carried on slowly, as above described, so that each following feeding stroke of the carrier will cause the cutter to cut slightly deeper than the one preceding, and after the blank has made one revolution on its own axis, and the cutter has made the first cut into each space of the blank, it will make a second cut into the first space somewhat deeper than the first cut. This process will continue during the complete rolling action of the blank or until it has proceeded so far that the cutter ceases to cut.

In a cutting bevel gear, this first operation correctly generates an involute tooth face on only one side of each tooth space of the blank, and in order to obtain the convergent space peculiar to bevel gears, both the cutter and the blank are then readjusted in the usual manner as shown for example in the patent to Bilgram No. 665,054 (see Figs. 3 and 9) for the second operation that will generate the other tooth face of the tooth spaces.

The operation of adjusting the various parts of the machine will be understood, it is believed, from the detail description above.

Having thus described my invention, what I claim and desire to secure by Letters Patent is:—

1. In a machine for cutting gears, the combination with means for holding the blank, of a circular cutter having radially arranged cutting edges of substantially rack tooth form, means for rotating the cutter, means for feeding the cutter in a curved path across the face of the blank, and means for relatively rolling the blank and cutter to generate the gear tooth.

2. In a machine for cutting gears, the combination with means for holding the blank, of means for forming teeth of the indirect type including a circular cutter having radially arranged cutting edges of substantially rack tooth form, means for rotating the cutter, and means for feeding the cutter in an indirect path across the face of the blank.

3. In a machine for cutting gears, the combination with means for holding the blank, of means for forming teeth of the indirect type including a rotary cutter, means for rotating said cutter, and means for feeding the cutter in a curved path across the face of the gear blank in a plane parallel to a plane passing through the axis of the cutter.

4. In a machine for cutting gears, the combination with means for holding the blank, of means for forming teeth of the indirect type including a carrier, a rotary cutter having cutting edges of rack tooth form mounted on said carrier, means for securing the cutter against axial movement relative to the carrier, means for rotating the cutter, and means for reciprocating the carrier in an indirect path to carry the cutter back and forth across the face of the blank to thereby make a continuous cut on both the forward and return strokes thereof.

5. In a machine for cutting gears, the combination with means for holding the blank, of a carrier, a rotary cutter having cutting edges of rack tooth form mounted on said carrier, means for rotating the cutter, means for giving the carrier a dwell at one end of its reciprocation, and means for turning the gear blank while the carrier is at said end of its stroke to present another portion to the cutter.

6. In a machine for cutting gears, the combination with means for holding the blank, of a carrier, a rotary cutter having cutting edges of rack tooth form mounted on said carrier, means for rotating the cutter, means for relatively rolling the blank and cutter to generate the gear tooth, and means for reciprocating the carrier in a non-rectilinear path to carry the cutter back and forth across the face of the blank to thereby make a continuous cut on one side of a tooth on both the forward and return strokes.

7. In a machine for cutting gears, the combination with means for holding the blank, of means for forming teeth of the indirect type including a carrier, a rotary cutter mounted on said carrier, means for rotating the cutter, and means for reciprocating the carrier in an indirect path, one of the strokes of the carrier being at a substantially constant velocity.

8. In a machine for cutting gears, the combination with means for holding the blank, of means for forming teeth of the indirect type including a carrier, a rotary cutter mounted on said carrier, means for rotating the cutter, and cam means for reciprocating the carrier in a non-rectilinear path, one of the strokes of the carrier being at a constant velocity.

9. In a machine for cutting gears, the combination with means for holding the blank, of a rotary cutter and means for rotating it, means for moving the cutter to take a cut on both the forward and back strokes across the face of the gear blank, means for giving the cutter a dwell at the end of its back stroke, and means for rotating the blank to bring another part of the same opposite the cutter during said dwell.

10. In a machine for cutting gears, the combination with means for holding the blank, of a rotary cutter and means for rotating it, means for moving the cutter in a translatory path to take a cut on both the forward and back strokes across the face of the blank, means for giving the cutter a dwell at the end of its back stroke, and means for rotating the blank to bring another part of the same opposite the cutter during said dwell.

11. In a gear cutting machine, the combination with a blank holding and rolling means, of a rotary cutter, a carrier therefor, means for moving the carrier across the face of the blank to feed the cutter, and means on the carrier for rotating the cutter.

12. In a gear cutting machine, the combination with a blank holding and rolling means, of a rotary cutter, a carrier therefor, means for moving the carrier in a curved path across the face of the blank to feed the cutter, and means on the carrier for rotating the cutter.

13. In a gear cutting machine, main driving means, means for holding a gear blank, a carrier, means for reciprocating said carrier from said driving means, a rotary cutter mounted on said carrier, and means independent of said main driving means for rotating said cutter.

14. In a gear cutting machine, the combination with a blank holding and rolling means, of a rotary cutter, a carrier therefor, means for moving the carrier across the face of the blank to feed the cutter, and a motor mounted on the carrier and connected to operate the cutter.

15. In a gear cutting machine, the combination with a blank holding and rolling means, of a rotary cutter, a carrier therefor, a ram for supporting the carrier, means for reciprocating the ram, means for simultaneously causing a lateral movement of the carrier on the ram, and means mounted on the carrier for rotating the cutter.

16. In a machine for cutting gears, the combination with means for holding the blank, of a rotary cutter, a reciprocating carrier therefor, an adjustable holder on the carrier and in which said cutter is rotatably mounted, cutter operating means mounted on the carrier, and flexible driving connections from the latter said means to the cutter.

17. In a machine for cutting gears, the combination with means for holding the blank, of a rotary cutter, a reciprocating carrier therefor, an adjustable holder on the carrier and in which said cutter is rotatably mounted, an electric motor mounted on said carrier and flexible driving connections from said motor to the cutter.

18. In a machine for cutting gears, the combination with means for holding the blank and means for rotating the blank tooth by tooth, of a rotating cutter, means for rotating the cutter, a carrier for the cutter, means for reciprocating the carrier to feed the cutter while the blank is held in non-rotating position, and means for holding the carrier stationary at one end of its stroke while the blank is rotated a tooth space.

19. In a machine for cutting gears, the combination with means for holding the blank and means for rotating the blank tooth by tooth, of a rotating cutter, means for rotating the cutter, a carrier for the cutter, means for moving the carrier forward and back to feed the cutter across the face of the blank while the latter is held in non-rotating position, and means for holding the carrier stationary at one end of its stroke while the blank is rotated a tooth space.

20. In a gear cutting machine, the combination with means for holding the blank, of a rotary cutter and means for rotating it, means for moving the cutter across the face of the blank concentrically about an axis normal to the axis of rotation of the cutter, and means for rolling the blank on its pitch surface to generate the teeth.

21. In a gear cutting machine, the combination of a carrier, a cutter holder pivotally supported on the carrier, the axis of the pivot being substantially in line with the cutting face of the cutter as it is making the cut, and means for adjusting the holder on its pivot.

22. In a gear cutting machine, the combination of a carrier, a cutter holder pivotally supported on the carrier, a cutter mounted in the holder with a cutting edge substantially under the pivot of the holder, and means for adjusting the holder on its pivot.

23. In a gear cutting machine, the combination of a carrier, a cutter holder pivoted at its forward end to the carrier, a cutter mounted in the forward end of the holder, and means for swinging the rear part of the holder to adjust the cutting face of the cutter.

24. In a gear cutting machine, the combination of a carrier, a cutter holder pivotally supported on the carrier, a rotary cutter mounted in the holder, and means for adjusting the holder to vary the axis of the cutter.

25. In a gear cutting machine, the combination of a carrier, a cutter holder pivotally supported thereon, a cutter rotatably mounted on the holder with its axis in the plane of and normal to the axis of the holder pivot, and means for adjusting the holder on its pivot.

In testimony whereof I affix my signature in the presence of two witnesses.

CHARLES E. DERR.

Witnesses:
Le Roi J. Williams,
A. K. Speer.